(12) United States Patent
Machocki (10) Patent No.: US 11,697,991 B2
(45) Date of Patent: Jul. 11, 2023

(54) RIG SENSOR TESTING AND CALIBRATION

(71) Applicant: Saudi Arabian Oil Company, Dhahran (SA)

(72) Inventor: Krzysztof Karol Machocki, Aberdeen (GB)

(73) Assignee: Saudi Arabian Oil Company, Dhahran (SA)

(*) Notice: Subject to any disclaimer, the term of this patent is extended or adjusted under 35 U.S.C. 154(b) by 172 days.

(21) Appl. No.: 17/148,378

(22) Filed: Jan. 13, 2021

(65) Prior Publication Data

US 2022/0220845 A1 Jul. 14, 2022

(51) Int. Cl.
*E21B 47/13* (2012.01)
*G01V 13/00* (2006.01)

(52) U.S. Cl.
CPC ............ *E21B 47/13* (2020.05); *G01V 13/00* (2013.01)

(58) Field of Classification Search
CPC ......... G01V 13/00; E21B 47/12; E21B 47/13; E21B 47/14; E21B 3/02
See application file for complete search history.

(56) References Cited

U.S. PATENT DOCUMENTS

| | | |
|---|---|---|
| 891,957 A | 6/1908 | Schubert |
| 2,043,225 A | 6/1936 | Armentrout et al. |
| 2,110,913 A | 3/1938 | Lowrey |
| 2,227,729 A | 1/1941 | Lynes |
| 2,286,673 A | 6/1942 | Douglas |
| 2,305,062 A | 12/1942 | Church et al. |
| 2,344,120 A | 3/1944 | Baker |
| 2,757,738 A | 9/1948 | Ritchey |
| 2,509,608 A | 5/1950 | Penfield |
| 2,688,369 A | 9/1954 | Broyles |
| 2,690,897 A | 10/1954 | Clark |

(Continued)

FOREIGN PATENT DOCUMENTS

| | | |
|---|---|---|
| CA | 1226325 | 9/1987 |
| CA | 2249432 | 9/2005 |

(Continued)

OTHER PUBLICATIONS

Akersolutions, "Aker MH CCTC Improving Safety," Akersolutions, Jan. 2008, 12 pages.

(Continued)

*Primary Examiner* — Yoshihisa Ishizuka
*Assistant Examiner* — Christopher J Gassen
(74) *Attorney, Agent, or Firm* — Fish & Richardson P.C.

(57) ABSTRACT

A method includes attaching a sensor calibration tool to a drill string. The sensor calibration tool includes a first tool sensor configured to measure a first operational parameter. A first tool sensor measurement of the first operational parameter is received from the first tool sensor, where the drill string is disposed at least partially within a wellbore and supported by a surface rig system and the sensor calibration tool is positioned on the drill string at a surface location proximate to the surface rig system. A first rig sensor measurement of the first operational parameter is received from a first rig sensor positioned on a first surface component of the surface rig system. The first rig sensor is calibrated based on a comparison of the first tool sensor measurement with the first rig sensor measurement.

20 Claims, 4 Drawing Sheets

(56) References Cited

U.S. PATENT DOCUMENTS

| | | |
|---|---|---|
| 2,719,363 A | 10/1955 | Richard et al. |
| 2,795,279 A | 6/1957 | Erich |
| 2,799,641 A | 7/1957 | Gordon |
| 2,805,045 A | 9/1957 | Goodwin |
| 2,822,150 A | 2/1958 | Muse et al. |
| 2,841,226 A | 7/1958 | Conrad et al. |
| 2,899,000 A | 8/1959 | Medders et al. |
| 2,927,775 A | 3/1960 | Hildebrandt |
| 3,016,244 A | 1/1962 | Friedrich et al. |
| 3,028,915 A | 4/1962 | Jennings |
| 3,087,552 A | 4/1963 | Graham |
| 3,102,599 A | 9/1963 | Hillbum |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,220,478 A | 11/1965 | Kinzbach |
| 3,236,307 A | 2/1966 | Brown |
| 3,253,336 A | 5/1966 | Brown |
| 3,268,003 A | 8/1966 | Essary |
| 3,331,439 A | 7/1967 | Lawrence |
| 3,428,125 A | 2/1969 | Parker |
| 3,468,373 A | 9/1969 | Smith |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,656,564 A | 4/1972 | Brown |
| 3,696,866 A | 10/1972 | Dryden |
| 3,839,791 A | 10/1974 | Feamster |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,064,211 A | 12/1977 | Wood |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,191,493 A | 3/1980 | Hansson et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,334,928 A | 6/1982 | Hara |
| 4,337,653 A | 7/1982 | Chauffe |
| 4,343,651 A | 8/1982 | Yazu et al. |
| 4,354,559 A | 10/1982 | Johnson |
| 4,373,581 A | 2/1983 | Toellner |
| 4,394,170 A | 7/1983 | Sawaoka et al. |
| 4,396,062 A | 8/1983 | Iskander |
| 4,412,585 A | 11/1983 | Bouck |
| 4,413,642 A | 11/1983 | Smith et al. |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,557,327 A | 12/1985 | Kinley et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,636,934 E | 1/1987 | Schwendemann |
| RE32,345 E | 3/1987 | Wood |
| 4,660,636 A | 4/1987 | Rundell et al. |
| 4,705,108 A | 11/1987 | Little et al. |
| 4,817,711 A | 4/1989 | Jearnbey |
| 5,012,863 A | 5/1991 | Springer |
| 5,018,580 A | 5/1991 | Skipper |
| 5,037,704 A | 8/1991 | Nakai et al. |
| 5,055,180 A | 10/1991 | Klaila |
| 5,068,819 A | 11/1991 | Misra et al. |
| 5,070,952 A | 12/1991 | Neff |
| 5,074,355 A | 12/1991 | Lennon |
| 5,082,054 A | 1/1992 | Kiamanesh |
| 5,092,056 A | 3/1992 | Deaton |
| 5,107,705 A | 4/1992 | Wraight et al. |
| 5,107,931 A | 4/1992 | Valka et al. |
| 5,228,518 A | 7/1993 | Wilson et al. |
| 5,236,039 A | 8/1993 | Edelstein et al. |
| 5,278,550 A | 1/1994 | Rhein-Knudsen et al. |
| 5,319,272 A | 6/1994 | Raad |
| 5,388,648 A | 2/1995 | Jordan, Jr. |
| 5,490,598 A | 2/1996 | Adams |
| 5,501,248 A | 3/1996 | Kiest, Jr. |
| 5,690,826 A | 11/1997 | Cravello |
| 5,803,186 A | 9/1998 | Berger et al. |
| 5,803,666 A | 9/1998 | Keller |
| 5,813,480 A | 9/1998 | Zaleski, Jr. et al. |
| 5,853,049 A | 12/1998 | Keller |
| 5,890,540 A | 4/1999 | Pia et al. |
| 5,899,274 A | 5/1999 | Frauenfeld et al. |
| 5,947,213 A | 9/1999 | Angle |
| 5,955,666 A | 9/1999 | Mullins |
| 5,958,236 A | 9/1999 | Bakula |
| RE36,362 E | 11/1999 | Jackson |
| 6,012,526 A | 1/2000 | Jennings et al. |
| 6,032,742 A | 3/2000 | Tomlin et al. |
| 6,041,860 A | 3/2000 | Nazzal et al. |
| 6,047,239 A | 4/2000 | Berger et al. |
| 6,096,436 A | 8/2000 | Inspektor |
| 6,170,531 B1 | 1/2001 | Jung et al. |
| 6,173,795 B1 | 1/2001 | McGarian et al. |
| 6,189,611 B1 | 2/2001 | Kasevich |
| 6,206,108 B1 | 3/2001 | MacDonald et al. |
| 6,254,844 B1 | 7/2001 | Takeuchi et al. |
| 6,268,726 B1 | 7/2001 | Prammer |
| 6,269,953 B1 | 8/2001 | Seyffert et al. |
| 6,290,068 B1 | 9/2001 | Adams et al. |
| 6,305,471 B1 | 10/2001 | Milloy |
| 6,325,216 B1 | 12/2001 | Seyffert et al. |
| 6,328,111 B1 | 12/2001 | Bearden et al. |
| 6,330,913 B1 | 12/2001 | Langseth et al. |
| 6,354,371 B1 | 3/2002 | O'Blanc |
| 6,371,302 B1 | 4/2002 | Adams et al. |
| 6,413,399 B1 | 7/2002 | Kasevich |
| 6,443,228 B1 | 9/2002 | Aronstam |
| 6,454,099 B1 | 9/2002 | Adams et al. |
| 6,510,947 B1 | 1/2003 | Schulte et al. |
| 6,534,980 B2 | 2/2003 | Toufaily et al. |
| 6,544,411 B2 | 4/2003 | Varandaraj |
| 6,561,269 B1 | 5/2003 | Brown et al. |
| 6,571,877 B1 | 6/2003 | Van Bilderbeek |
| 6,607,080 B2 | 8/2003 | Winkler et al. |
| 6,612,384 B1 | 9/2003 | Singh et al. |
| 6,622,554 B2 | 9/2003 | Manke et al. |
| 6,623,850 B2 | 9/2003 | Kukino et al. |

(56) References Cited

U.S. PATENT DOCUMENTS

| | | |
|---|---|---|
| 6,629,610 B1 | 10/2003 | Adams et al. |
| 6,637,092 B1 | 10/2003 | Menzel |
| 6,648,082 B2 | 11/2003 | Schultz et al. |
| 6,678,616 B1 | 1/2004 | Winkler et al. |
| 6,722,504 B2 | 4/2004 | Schulte et al. |
| 6,741,000 B2 | 5/2004 | Newcomb |
| 6,761,230 B2 | 7/2004 | Cross et al. |
| 6,814,141 B2 | 11/2004 | Huh et al. |
| 6,827,145 B2 | 12/2004 | Fotland et al. |
| 6,845,818 B2 | 1/2005 | Tutuncu et al. |
| 6,850,068 B2 | 2/2005 | Chernali et al. |
| 6,895,678 B2 | 5/2005 | Ash et al. |
| 6,912,177 B2 | 6/2005 | Smith |
| 6,971,265 B1 | 12/2005 | Sheppard et al. |
| 6,993,432 B2 | 1/2006 | Jenkins et al. |
| 7,000,777 B2 | 2/2006 | Adams et al. |
| 7,013,992 B2 | 3/2006 | Tessari et al. |
| 7,048,051 B2 | 5/2006 | McQueen |
| 7,063,155 B2 | 6/2006 | Ruttley |
| 7,086,463 B2 | 8/2006 | Ringgenberg et al. |
| 7,091,460 B2 | 8/2006 | Kinzer |
| 7,109,457 B2 | 9/2006 | Kinzer |
| 7,115,847 B2 | 10/2006 | Kinzer |
| 7,124,819 B2 | 10/2006 | Ciglenec et al. |
| 7,168,507 B2 | 1/2007 | Downton |
| 7,216,767 B2 | 5/2007 | Schulte et al. |
| 7,312,428 B2 | 12/2007 | Kinzer |
| 7,322,776 B2 | 1/2008 | Webb et al. |
| 7,331,385 B2 | 2/2008 | Symington |
| 7,376,514 B2 | 5/2008 | Habashy et al. |
| 7,387,174 B2 | 6/2008 | Lurie |
| 7,445,041 B2 | 11/2008 | O'Brien |
| 7,455,117 B1 | 11/2008 | Hall et al. |
| 7,461,693 B2 | 12/2008 | Considine et al. |
| 7,484,561 B2 | 2/2009 | Bridges |
| 7,539,548 B2 | 5/2009 | Dhawan |
| 7,562,708 B2 | 7/2009 | Cogliandro et al. |
| 7,629,497 B2 | 12/2009 | Pringle |
| 7,631,691 B2 | 12/2009 | Symington et al. |
| 7,647,980 B2 | 1/2010 | Corre et al. |
| 7,650,269 B2 | 1/2010 | Rodney |
| 7,677,673 B2 | 3/2010 | Tranquilla et al. |
| 7,730,625 B2 | 6/2010 | Blake |
| 7,779,903 B2 | 8/2010 | Bailey et al. |
| 7,951,482 B2 | 5/2011 | Ichinose et al. |
| 7,980,392 B2 | 7/2011 | Varco |
| 8,067,865 B2 | 11/2011 | Savant |
| 8,237,444 B2 | 8/2012 | Simon |
| 8,245,792 B2 | 8/2012 | Trinh et al. |
| 8,275,549 B2 | 9/2012 | Sabag et al. |
| 8,286,734 B2 | 10/2012 | Hannegan et al. |
| 8,484,858 B2 | 7/2013 | Brannigan et al. |
| 8,511,404 B2 | 8/2013 | Rasheed |
| 8,526,171 B2 | 9/2013 | Wu et al. |
| 8,528,668 B2 | 9/2013 | Rasheed |
| 8,567,491 B2 | 10/2013 | Lurie |
| 8,794,062 B2 | 8/2014 | DiFoggio et al. |
| 8,884,624 B2 | 11/2014 | Homan et al. |
| 8,925,213 B2 | 1/2015 | Sallwasser |
| 8,960,215 B2 | 2/2015 | Cui et al. |
| 8,973,680 B2 | 3/2015 | MacKenzie |
| 9,051,810 B1 | 6/2015 | Cuffe et al. |
| 9,109,429 B2 | 8/2015 | Xu et al. |
| 9,217,323 B2 | 12/2015 | Clark |
| 9,222,350 B2 | 12/2015 | Vaughn et al. |
| 9,238,953 B2 | 1/2016 | Fleming et al. |
| 9,238,961 B2 | 1/2016 | Bedouet |
| 9,250,339 B2 | 2/2016 | Ramirez |
| 9,353,589 B2 | 5/2016 | Hekelaar |
| 9,394,782 B2 | 7/2016 | DiGiovanni et al. |
| 9,435,159 B2 | 9/2016 | Scott |
| 9,464,487 B1 | 10/2016 | Zurn |
| 9,470,059 B2 | 10/2016 | Zhou |
| 9,494,010 B2 | 11/2016 | Flores |
| 9,494,032 B2 | 11/2016 | Roberson et al. |
| 9,512,708 B2 | 12/2016 | Hay |
| 9,528,366 B2 | 12/2016 | Selman et al. |
| 9,562,987 B2 | 2/2017 | Guner et al. |
| 9,617,815 B2 | 4/2017 | Scwartze et al. |
| 9,664,011 B2 | 5/2017 | Kruspe et al. |
| 9,702,211 B2 | 7/2017 | Tinnen |
| 9,731,471 B2 | 8/2017 | Schaedler et al. |
| 9,739,141 B2 | 8/2017 | Zeng et al. |
| 9,845,653 B2 | 12/2017 | Hannegan et al. |
| 9,885,232 B2 | 2/2018 | Close et al. |
| 10,000,983 B2 | 6/2018 | Jackson et al. |
| 10,174,577 B2 | 1/2019 | Leuchtenberg et al. |
| 10,233,372 B2 | 3/2019 | Ramasamy et al. |
| 10,329,877 B2 | 6/2019 | Simpson et al. |
| 10,392,910 B2 | 8/2019 | Walton et al. |
| 10,394,193 B2 | 8/2019 | Li et al. |
| 10,544,640 B2 | 1/2020 | Hekelaar et al. |
| 2002/0066563 A1 | 6/2002 | Langseth et al. |
| 2003/0137430 A1* | 7/2003 | Chalitsios ............ G08C 19/16 340/853.1 |
| 2003/0159776 A1 | 8/2003 | Graham |
| 2003/0230526 A1 | 12/2003 | Okabayshi et al. |
| 2004/0182574 A1 | 9/2004 | Sarmad et al. |
| 2004/0256103 A1 | 12/2004 | Batarseh |
| 2005/0022987 A1 | 2/2005 | Green et al. |
| 2005/0092523 A1 | 5/2005 | McCaskill et al. |
| 2005/0259512 A1 | 11/2005 | Mandal |
| 2006/0016592 A1 | 1/2006 | Wu |
| 2006/0106541 A1 | 5/2006 | Hassan et al. |
| 2006/0144620 A1 | 7/2006 | Cooper |
| 2006/0185843 A1 | 8/2006 | Smith |
| 2006/0248949 A1 | 11/2006 | Gregory et al. |
| 2006/0249307 A1 | 11/2006 | Ritter |
| 2007/0131591 A1 | 6/2007 | Pringle |
| 2007/0137852 A1 | 6/2007 | Considine et al. |
| 2007/0175633 A1 | 8/2007 | Kosmala |
| 2007/0187089 A1 | 8/2007 | Bridges |
| 2007/0204994 A1 | 9/2007 | Wimmersperg |
| 2007/0289736 A1 | 12/2007 | Kearl et al. |
| 2008/0007421 A1 | 1/2008 | Liu et al. |
| 2008/0047337 A1 | 2/2008 | Chemali et al. |
| 2008/0053652 A1 | 3/2008 | Corre et al. |
| 2008/0173480 A1 | 7/2008 | Annaiyappa et al. |
| 2008/0190822 A1 | 8/2008 | Young |
| 2008/0308282 A1 | 12/2008 | Standridge et al. |
| 2009/0153354 A1 | 6/2009 | Daussin |
| 2009/0164125 A1 | 6/2009 | Bordakov et al. |
| 2009/0178809 A1 | 7/2009 | Jeffryes et al. |
| 2009/0259446 A1 | 10/2009 | Zhang et al. |
| 2010/0006339 A1 | 1/2010 | Desai |
| 2010/0089583 A1 | 4/2010 | Xu et al. |
| 2010/0276209 A1 | 11/2010 | Yong et al. |
| 2010/0282511 A1 | 11/2010 | Maranuk |
| 2011/0011576 A1 | 1/2011 | Cavender et al. |
| 2011/0120732 A1 | 5/2011 | Lurie |
| 2011/0155368 A1 | 6/2011 | El-Khazindar |
| 2011/0169353 A1 | 7/2011 | Endo |
| 2011/0272147 A1 | 11/2011 | Beasley et al. |
| 2012/0012319 A1 | 1/2012 | Dennis |
| 2012/0111578 A1 | 5/2012 | Tverlid |
| 2012/0132418 A1 | 5/2012 | McClung |
| 2012/0152543 A1 | 6/2012 | Davis |
| 2012/0173196 A1 | 7/2012 | Miszewski |
| 2012/0186817 A1 | 7/2012 | Gibson et al. |
| 2012/0222854 A1 | 9/2012 | McClung, III |
| 2012/0227983 A1 | 9/2012 | Lymberopoulous et al. |
| 2012/0273187 A1 | 11/2012 | Hall |
| 2013/0008653 A1 | 1/2013 | Schultz et al. |
| 2013/0008671 A1 | 1/2013 | Booth |
| 2013/0025943 A1 | 1/2013 | Kumar |
| 2013/0076525 A1 | 3/2013 | Vu et al. |
| 2013/0119830 A1 | 5/2013 | Hautz |
| 2013/0125642 A1 | 5/2013 | Parfitt |
| 2013/0126164 A1 | 5/2013 | Sweatman et al. |
| 2013/0146359 A1 | 6/2013 | Koederitz |
| 2013/0213637 A1 | 8/2013 | Kearl |
| 2013/0255936 A1 | 10/2013 | Statoilydro et al. |
| 2014/0083771 A1 | 3/2014 | Clark |
| 2014/0183143 A1 | 7/2014 | Cady et al. |

(56) References Cited

U.S. PATENT DOCUMENTS

| | | |
|---|---|---|
| 2014/0231075 A1 | 8/2014 | Springett et al. |
| 2014/0231147 A1 | 8/2014 | Bozso et al. |
| 2014/0238658 A1 | 8/2014 | Wilson et al. |
| 2014/0246235 A1 | 9/2014 | Yao |
| 2014/0251894 A1 | 9/2014 | Larson et al. |
| 2014/0265337 A1 | 9/2014 | Harding et al. |
| 2014/0278111 A1 | 9/2014 | Gerrie et al. |
| 2014/0291023 A1 | 10/2014 | Edbury |
| 2014/0300895 A1 | 10/2014 | Pope et al. |
| 2014/0333754 A1 | 11/2014 | Graves et al. |
| 2014/0360778 A1 | 12/2014 | Batarseh |
| 2014/0375468 A1 | 12/2014 | Wilkinson et al. |
| 2015/0020908 A1 | 1/2015 | Warren |
| 2015/0021240 A1 | 1/2015 | Wardell et al. |
| 2015/0027724 A1 | 1/2015 | Symms |
| 2015/0083422 A1 | 3/2015 | Pritchard |
| 2015/0091737 A1 | 4/2015 | Richardson et al. |
| 2015/0101864 A1 | 4/2015 | May |
| 2015/0159467 A1 | 6/2015 | Hartman et al. |
| 2015/0211362 A1 | 7/2015 | Rogers |
| 2015/0267500 A1 | 9/2015 | Van Dongen |
| 2015/0290878 A1 | 10/2015 | Houben et al. |
| 2015/0300151 A1 | 10/2015 | Mohaghegh |
| 2016/0053572 A1 | 2/2016 | Snoswell |
| 2016/0053604 A1 | 2/2016 | Abbassian |
| 2016/0076357 A1 | 3/2016 | Hbaieb |
| 2016/0115783 A1 | 4/2016 | Zeng et al. |
| 2016/0130928 A1 | 5/2016 | Torrione |
| 2016/0153240 A1 | 6/2016 | Braga et al. |
| 2016/0160106 A1 | 6/2016 | Jamison et al. |
| 2016/0164377 A1 | 6/2016 | Gauthier |
| 2016/0237810 A1 | 8/2016 | Beaman et al. |
| 2016/0247316 A1 | 8/2016 | Whalley et al. |
| 2016/0356125 A1 | 12/2016 | Bello et al. |
| 2017/0051785 A1 | 2/2017 | Cooper |
| 2017/0161885 A1 | 6/2017 | Parmeshwar et al. |
| 2017/0234104 A1 | 8/2017 | James |
| 2017/0292376 A1 | 10/2017 | Kumar et al. |
| 2017/0314335 A1 | 11/2017 | Kosonde et al. |
| 2017/0328196 A1 | 11/2017 | Shi et al. |
| 2017/0328197 A1 | 11/2017 | Shi et al. |
| 2017/0342776 A1 | 11/2017 | Bullock et al. |
| 2017/0343006 A1 | 11/2017 | Ehrsann |
| 2017/0346371 A1 | 11/2017 | Gruetzner |
| 2017/0350201 A1 | 12/2017 | Shi et al. |
| 2017/0350241 A1 | 12/2017 | Shi |
| 2018/0010030 A1 | 1/2018 | Ramasamy et al. |
| 2018/0010419 A1 | 1/2018 | Livescu et al. |
| 2018/0010450 A1* | 1/2018 | Forstner ............... E21B 49/005 |
| 2018/0171772 A1 | 6/2018 | Rodney |
| 2018/0187498 A1 | 7/2018 | Soto et al. |
| 2018/0265416 A1 | 9/2018 | Ishida et al. |
| 2018/0326679 A1 | 11/2018 | Weisenberg et al. |
| 2018/0334883 A1 | 11/2018 | Williamson |
| 2018/0363404 A1 | 12/2018 | Faugstad |
| 2019/0049054 A1 | 2/2019 | Gunnarsson et al. |
| 2019/0079210 A1* | 3/2019 | Ma ........................ G01V 1/50 |
| 2019/0101872 A1 | 4/2019 | Li |
| 2019/0227499 A1 | 7/2019 | Li et al. |
| 2019/0257180 A1 | 8/2019 | Kriesels et al. |
| 2019/0316463 A1 | 10/2019 | Pfrenger et al. |
| 2020/0032638 A1 | 1/2020 | Ezzeddine |
| 2020/0182038 A1* | 6/2020 | Soukup ............... E21B 41/0092 |
| 2020/0220431 A1 | 7/2020 | Wrighton |
| 2020/0326226 A1 | 10/2020 | Camacho Cardenas |

FOREIGN PATENT DOCUMENTS

| | | |
|---|---|---|
| CA | 2537585 | 8/2006 |
| CA | 2669721 | 7/2011 |
| CA | 2594042 | 8/2012 |
| CN | 200989202 | 12/2007 |
| CN | 203232293 | 10/2013 |
| CN | 204627586 | 9/2015 |
| CN | 107462222 | 12/2017 |
| CN | 110571475 | 12/2019 |
| DE | 102008001607 | 11/2009 |
| DE | 102012022453 | 5/2014 |
| DE | 102013200450 | 7/2014 |
| DE | 102012205757 | 8/2014 |
| EP | 2317068 | 5/2011 |
| EP | 2574722 | 4/2013 |
| EP | 2737173 | 6/2014 |
| GB | 2124855 | 2/1984 |
| GB | 2357305 | 6/2001 |
| GB | 2399515 | 9/2004 |
| GB | 2422125 | 7/2006 |
| GB | 2532967 | 6/2016 |
| JP | 2009067609 | 4/2009 |
| JP | 4275896 | 6/2009 |
| JP | 5013156 | 8/2012 |
| JP | 2013110910 | 6/2013 |
| NO | 343139 | 11/2018 |
| NO | 20161842 | 5/2019 |
| RU | 2282708 | 8/2006 |
| RU | 122531 | 11/2012 |
| WO | WO 1995035429 | 12/1995 |
| WO | WO 1997021904 | 6/1997 |
| WO | WO 2000025942 | 5/2000 |
| WO | WO 2000031374 | 6/2000 |
| WO | WO 2001042622 | 6/2001 |
| WO | WO 2002020944 | 3/2002 |
| WO | WO 2002068793 | 9/2002 |
| WO | WO 2004042185 | 5/2004 |
| WO | WO 2007049026 | 5/2007 |
| WO | WO 2007070305 | 6/2007 |
| WO | WO 2008146017 | 12/2008 |
| WO | WO 2009020889 | 2/2009 |
| WO | WO 2009113895 | 9/2009 |
| WO | WO 2010105177 | 9/2010 |
| WO | WO 2011038170 | 3/2011 |
| WO | WO 2011042622 | 6/2011 |
| WO | WO 2012007407 | 1/2012 |
| WO | WO 2013016095 | 1/2013 |
| WO | WO 2013148510 | 10/2013 |
| WO | WO 2014127035 | 8/2014 |
| WO | WO 2015095155 | 6/2015 |
| WO | WO 2016178005 | 11/2016 |
| WO | WO 2017011078 | 1/2017 |
| WO | WO 2017132297 | 8/2017 |
| WO | WO 2017196303 | 11/2017 |
| WO | WO 2018022198 | 2/2018 |
| WO | WO 2018169991 | 9/2018 |
| WO | WO 2019040091 | 2/2019 |
| WO | WO 2019055240 | 3/2019 |
| WO | WO 2019089926 | 5/2019 |
| WO | WO 2019108931 | 6/2019 |
| WO | WO 2019169067 | 9/2019 |
| WO | WO 2019236288 | 12/2019 |
| WO | WO 2019246263 | 12/2019 |

OTHER PUBLICATIONS

Anwar et al.,"Fog computing: an overview of big IoT data analytics," Article ID 7157192, Hindawi, Wiley, Wireless communications and mobile computing, May 2018, 2018: 1-22, 23 pages.

Artymiuk et al., "The new drilling control and monitoring system," Acta Montanistica Slovaca, Sep. 2004, 9:3 (145-151), 7 pages.

Ashby et al., "Coiled Tubing Conveyed Video Camera and Multi-Arm Caliper Liner Damage Diagnostics Post Plug and Perf Frac," SPE-172622-MS, Society of Petroleum Engineers (SPE), presented at the SPE Middle East Oil and Gas Show and Conference, Mar. 8-11, 2015, 12 pages.

Bestebit, "IADC Dull Grading for PDC Drill Bits," Beste Bit, SPE/IADC 23939, Society of Petroleum Engineers (SPE), International Association of Drilling Contractors (IADC), 1992, 52 pages.

Bilal et al., "Potentials, trends, and prospects in edge technologies: Fog, cloudlet, mobile edge, and micro data centers," Computer Networks, Elsevier, Oct. 2017, 130: 94-120, 27 pages.

Carpenter, "Advancing Deepwater Kick Detection," JPT, 68:5, May 2016, 2 pages.

(56) References Cited

OTHER PUBLICATIONS

Commer et al., "New advances in three-dimensional controlled-source electromagnetic inversion," Geophys. J. Int, 2008, 172: 513-535, 23 pages.

Dickens et al., "An LED array-based light induced fluorescence sensor for real-time process and field monitoring," Sensors and Actuators B: Chemical, Elsevier, Apr. 2011, 158:1 (35-42), 8 pages.

Dong et al., "Dual Substitution and Spark Plasma Sintering to Improve Ionic Conductivity of Garnet Li7La3Zr2O12," MDPI, Nanomaterials, 9:721, 2019, 10 pages.

Downholediagnostic.com [online] "Acoustic Fluid Level Surveys," retrieved from URL <https://www.downholediagnostic.com/fluid-level> retrieved on Mar. 27, 2020, available on or before 2018, 13 pages.

edition.cnn.com [online], "Revolutionary gel is five times stronger than steel," retrieved from URL <https://edition.cnn.com/style/article/hydrogel-steel-japan/index.html>, retrieved on Apr. 2, 2020, available on or before Jul. 16, 2017, 6 pages.

Gemmeke and Ruiter, "3D ultrasound computer tomography for medical imagining," Nuclear Instruments and Methods in Physics Research A 580 (1057-1065), Oct. 1, 2007, 9 pages.

Halliburton.com [online], "Drill Bits and Services Solutions Catalogs," retrieved from URL: <https://www.halliburton.com/content/dam/ps/public/sdbs/sdbs_contents/Books_and_Catalogs/web/DBS-Solution.pdf> on Sep. 26, 2019, Copyright 2014, 64 pages.

Hopkin, "Factor Affecting Cuttings Removal during Rotary Drilling," Journal of Petroleum Technology 19.06, Jun. 1967, 8 pages.

Ji et al., "Submicron Sized Nb Doped Lithium Garnet for High Ionic Conductivity Solid Electrolyte and Performance of All Solid-State Lithium Battery," Preprints, doi:10.20944/preprints201912.0307. v1, Dec. 2019, 10 pages.

Johnson et al., "Advanced Deepwater Kick Detection," IADC/SPE 167990, Society of Petroleum Engineers (SPE), International Association of Drilling Contractors (IADC), presented at the 2014 IADC/SPE Drilling Conference and Exhibition, Mar. 4-6, 2014, 10 pages.

Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.

King et al., "Atomic layer deposition of TiO2 films on particles in a fluidized bed reactor," Powder Technology, 183:3 (356-363), Apr. 2008, 8 pages.

Li et al., 3D Printed Hybrid Electrodes for Lithium-ion Batteries, Missouri University of Science and Technology, Washington State University; ECS Transactions, 77:11 (1209-1218), 2017, 11 pages.

Liu et al., "Flow visualization and measurement in flow field of a torque converter," Mechanic automation and control Engineering, Second International Conference on IEEE, Jul. 15, 2011, 1329-1331, 3 pages.

Liu et al., "Superstrong micro-grained poly crystalline diamond compact through work hardening under high pressure," Appl. Phys. Lett. Feb. 2018, 112:061901, 6 pages.

Luo et al., "Simple Charts to Determine Hole Cleaning Requirements in Deviated Wells," IADC/SPE 27486, International Association of Drilling Contractors (IADC), Society of Petroleum Engineers (SPE), presented at the 1994 SPE/IADC Drilling Conference, Society of Petroleum Engineers, Feb. 15-18, 1994, 7 pages.

Maurer, "The Perfect Cleaning Theory of Rotary Drilling," Journal of Petroleum Technology 14.11, 1962, 5 pages.

nature.com [online], "Mechanical Behavior of a Soft Hydrogel Reinforced with Three-Dimensional Printed Microfibre Scaffolds," retrieved from URL <https://www.nature.com/articles/s41598-018-19502-y>, retrieved on Apr. 2, 2020, available on or before Jan. 19, 2018, 47 pages.

Nuth, "Smart oil field distributed computing," The Industrial Ethernet Book, Nov. 2014, 85:14 (1-3), 3 pages.

Olver, "Compact Antenna Test Ranges," Seventh International Conference on Antennas and Propagation IEEE, Apr. 15-18, 1991, 10 pages.

Paiaman et al., "Effect of Drilling Fluid Properties on Rate Penetration," Nafta 60:3 (129-134), 2009, 6 pages.

Parini et al., "Chapter 3: Antenna measurements," in Theory and Practice of Modern Antenna Range Measurements, IET editorial, 2014, 30 pages.

petrowiki.org [online], "Hole Cleaning," retrieved on Jan. 25, 2019, retrieved from URL <http://petrowiki.org/Hole_cleaning#Annular-fluid_velocity>, 8 pages.

petrowiki.org [online], "Kicks," Petrowiki, available on or before Jun. 26, 2015, retrieved on Jan. 24, 2018, retrieved from URL <https://petrowiki.org/Kicks>, 6 pages.

Ranjbar, "Cutting Transport in Inclined and Horizontal Wellbore," University of Stavanger, Faculty of Science and Technology, Master's Thesis, Jul. 6, 2010, 137 pages.

Rasi, "Hold Cleaning in Large, High-Angle Wellbores," IADC/SPE 27464, International Association of Drilling Contractors (IADC), Society of Petroleum Engineers (SPE), presented at the 1994 SPE/IADC Drilling Conference, Feb. 15-18, 1994, 12 pages.

rigzone.com [online], "How does Well Control Work?" Rigzone, available on or before 1999, retrieved on Jan. 24, 2019, retrieved from URL <https://www.rigzone.com/training/insight.asp?insight_id=304&c_id>, 5 pages.

Robinson and Morgan, "Effect of Hole Cleaning on Drilling Rate Performance," Paper Aade-04-Df-Ho-42, AADE 2004 Drilling Fluids Conference, Houston, Texas, Apr. 6-7, 2004, 7 pages.

Robinson, "Economic Consequences of Poor Solids and Control," AADE 2006 Fluids Conference and Houston, Texas, Apr. 11-12, 2006, 9 pages.

Ruiter et al., "3D ultrasound computer tomography of the breast: A new era?" European Journal of Radiology 81S1, Sep. 2012, 2 pages.

sageoiltools.com [online] "Fluid Level & Dynamometer Instmments for Analysis due Optimization of Oil and Gas Wells," retrieved from URL <http://www.sageoiltools.com/>, retrieved on Mar. 27, 2020, available on or before 2019, 3 pages.

Schlumberger, "CERTIS: Retrievable, single-trip, production-level isolation system," www.slb.com/CERTIS, 2017, 2 pages.

Schlumberger, "First Rigless ESP Retrieval and Replacement with Slickline, Offshore Congo: Zeitecs Shuttle System Eliminates Need to Mobilize a Workover Rig," slb.com/zeitecs, 2016, 1 page.

Schlumberger, "The Lifting Business," Offshore Engineer, Mar. 2017, 1 page.

Schlumberger, "Zeitecs Shuttle System Decreases ESP Replacement Time by 87%: Customer ESP riglessly retrieved in less than 2 days on coiled tubing," slb.com/zeitecs, 2015, 1 page.

Schlumberger, "Zeitecs Shuttle System Reduces Deferred Production Even Before ESP is Commissioned, Offshore Africa: Third Party ESP developed fault during installation and was retrieved on rods, enabling operator to continue running tubing without waiting on replacement," slb.com/zeitecs, 2016, 2 pages.

Schlumberger, "Zeitecs Shuttle: Rigless ESP replacement system," Brochure, 8 pages.

Schlumberger, "Zeitecs Shuttle: Rigless ESP replacement system," Schlumberger, 2017, 2 pages.

Sifferman et al., "Drilling cutting transport in full scale vertical annuli," Journal of Petroleum Technology 26.11, 48th Annual Fall Meeting of the Society of Petroleum Engineers of AIME, Las Vegas, Sep. 30-Oct. 3, 1973, 12 pages.

slb.com' [online] "Technical Paper: ESP Retrievable Technology: A Solution to Enhance ESP Production While Minimizing Costs," SPE 156189 presented in 2012, retrieved from URL <http://www.slb.com/resources/technical_papers/artificial_lift/156189.aspx>, retrieved on Nov. 2, 2018, 1 pages.

slb.com' [online], "Zeitecs Shuttle Rigless ESP Replacement System," retrieved from URL <http://www.slb.com/services/production/artificial_lift/submersible/zeitecs-shuttle.aspx?t=3>, available on or before May 31, 2017, retrieved on Nov. 2, 2018, 3 pages.

Sulzer Metco, "An Introduction to Thermal Spray," 4, 2013, 24 pages.

Unegbu Celestine Tobenna, "Hole Cleaning Hydraulics," Universitetet o Stavanger, Faculty of Science and Technology, Master's Thesis, Jun. 15, 2010, 75 pages.

(56) References Cited

OTHER PUBLICATIONS

Weatherford, "RFID Advanced Reservoir Management System Optimizes Injection Well Design, Improves Reservoir Management," Weatherford.com, 2013, 2 pages.
Wei et al., "The Fabrication of All-Solid-State Lithium-Ion Batteries via Spark Plasma Sintering," Metals, 7:372, 2017, 9 pages.
Wellbore Service Tools: Retrievable tools, "RTTS Packer," Halliburton: Completion Tools, 2017, 4 pages.
wikipedia.org [online] "Optical Flowmeters," retrieved from URL <https://en.wikipedia.org/wiki/Flow_measurement#Optical_flowmeters>, retrieved on Mar. 27, 2020, available on or before Jan. 2020, 1 page.
wikipedia.org [online] "Ultrasonic Flow Meter," retrieved from URL <https://en.wikipedia.org/wiki/Ultrasonic_flow_meter> retrieved on Mar. 27, 2020, available on or before Sep. 2019, 3 pages.
wikipedia.org [online], "Surface roughness," retrieved from URL <https://en.wikipedia.org/wiki/Surface_roughness> retrieved on Apr. 2, 2020, available on or before Oct. 2017, 6 pages.
Williams and Bruce, "Carrying Capacity of Drilling Muds," Journal of Petroleum Technology, 3.04: 192, 1951, 10 pages.
Xia et al., "A Cutting Concentration Model of a Vertical Wellbore Annulus in Deep-water Drilling Operation and its Application," Applied Mechanics and Materials, 101-102: 311-314, Sep. 27, 2011, 5 pages.
Xue et al., "Spark plasma sintering plus heat-treatment of Ta-doped Li7La3Zr2O12 solid electrolyte and its ionic conductivity," Mater. Res. Express 2020, 7:025518, 8 pages.
Zhan et al. "Effect of (β-to-α Phase Transformation on the Microstructural Development and Mechanical Properties of Fine-Grained Silicon Carbide Ceramics," Journal of the American Ceramic Society 84:5 (945-50), May 2001, 6 pages.
Zhan et al. "Single-wall carbon nanotubes as attractive toughening agents in alumina-based nanocomposites." Nature Materials 2.1, Jan. 2003, 6 pages.
Zhan et al., "Atomic Layer Deposition on Bulk Quantities of Surfactant Modified Single-Walled Carbon Nanotubes," Journal of American Ceramic Society, 91:3 (831-835), Mar. 2008, 5 pages.
Zhang et al., "Increasing Polypropylene High Temperature Stability by Blending Polypropylene-Bonded Hindered Phenol Antioxidant," Macromolecules, 51:5 (1927-1936), 2018, 10 pages.
Zhu et al., "Spark Plasma Sintering of Lithium Aluminum Germanium Phosphate Solid Electrolyte and its Electrochemical Properties," University of British Columbia; Nanomaterials, 9:1086, 2019, 10 pages.
PCT International Search Report and Written Opinion in International Appln. No. PCT/US2022/012290, dated Apr. 21, 2022, 14 pages.

\* cited by examiner

RIG SENSOR TESTING AND CALIBRATION

TECHNICAL FIELD

This disclosure relates to wellbore drilling and production.

BACKGROUND

Hydrocarbons trapped in subsurface reservoirs are retrieved by first forming wellbores from the surface of the Earth to the subsurface reservoirs and then producing (that is, raising) the trapped hydrocarbons through the wellbores to the surface. Equipment used to drill the wellbores can include a drill string that is disposed in the wellbore and which includes a drill bit that drills into the Earth, and a surface rig system which supports the drill string and provides other functions. The surface rig system can include multiple surface components such as equipment to hoist and rotate the drill string and to pump drilling fluid into the drill string.

SUMMARY

This disclosure describes a system, tool, and method for monitoring the accuracy of the various rig sensors positioned on the various surface components of a well drilling system.

Certain aspects of the subject matter herein can be implemented as a method including attaching a sensor calibration tool to a drill string. The sensor calibration tool includes a first tool sensor configured to measure a first operational parameter. A first tool sensor measurement of the first operational parameter is received from the first tool sensor, where the drill string is disposed at least partially within a wellbore and supported by a surface rig system and the sensor calibration tool is positioned on the drill string at a surface location proximate to the surface rig system. A first rig sensor measurement of the first operational parameter is received from a first rig sensor positioned on a first surface component of the surface rig system. The first rig sensor is calibrated based on a comparison of the first tool sensor measurement with the first rig sensor measurement.

An aspect combinable with any of the other aspects can include the following features. The first tool sensor measurement and the first rig sensor measurement each include a respective plurality of measurements of the first operational parameter over a period of time.

An aspect combinable with any of the other aspects can include the following features. The sensor calibration tool includes a memory module. The first rig sensor measurement is stored in the memory module.

An aspect combinable with any of the other aspects can include the following features. The receiving of the first tool sensor measurement and the receiving of the first rig sensor measurement are by a data gathering and analysis module comprising a computer system comprising one or more processors and a non-transitory computer readable medium storing instructions executable by the one or more processors to perform operations.

An aspect combinable with any of the other aspects can include the following features. The sensor calibration tool includes a wireless transmitter. The first tool sensor measurement is transmitted from the sensor calibration tool via wireless telemetry to the data gathering and analysis module.

An aspect combinable with any of the other aspects can include the following features. A difference between the first tool sensor measurement and the first rig sensor measurement is calculated by the data gathering and analysis module. The difference is compared to a stored difference threshold by the data gathering and analysis module. An alert is transmitted by the data gathering and analysis module in response to the difference exceeding the stored difference threshold.

An aspect combinable with any of the other aspects can include the following features. Historical measurements from the first rig sensor of the first operational parameter are stored by the data gathering and analysis module. The historical measurements are adjusted by the data gathering and analysis module based in part on the comparison of the first tool sensor measurement with the first rig sensor measurement.

An aspect combinable with any of the other aspects can include the following features. The first operational parameter can include a frequency of rotation of the drill string, a pressure of fluid pumped through a stand pipe line and down the drill string, a flow rate of fluid pumped through the stand pipe line and down the drill string, a temperature of fluid pumped through the stand pipe line and down the drill string, a torque load of the drill string, a frequency of mud pump strokes, a weight of the drill string, vibrations in the drill string, or acoustic signals in proximity of the drill string.

An aspect combinable with any of the other aspects can include the following features. The first surface component of the surface rig system includes a stand pipe line, a top drive, a mud pump, a mud pit, a rotary table, or a draw works for a drill line.

An aspect combinable with any of the other aspects can include the following features. The first rig sensor is included in a plurality of rig sensors, each rig sensor positioned on a respective one of a plurality of surface components of the surface rig system, each rig sensor configured to measure a respective one of a plurality of operational parameters. The first tool sensor is included in a tool sensor bank disposed on the sensor calibration tool, the tool sensor bank comprising a plurality of tool sensors, each tool sensor of the tool sensor bank configured to measure a respective one of the plurality of operational parameters. A respective tool sensor measurement of the respective operational parameter for which the tool sensor is configured to measure receiving is received from each tool sensor in the tool sensor bank. A respective rig sensor measurement of the respective operational parameter for which the surface rig sensor is configured to measure is received from each of a plurality of rig sensors. Each of the plurality of rig sensors is calibrated based on a comparison of the respective tool sensor measurement with the respective tool sensor measurement of the respective operational parameter for which the rig sensor is configured to measure.

Certain aspects of the subject matter herein can be implemented as a drilling sensor calibration system. The drilling sensor calibration system includes a surface rig system configured to support a drill string, a first rig sensor positioned on a first surface component of the surface rig system, the first rig sensor configured to measure a first operational parameter, and a sensor calibration tool configured to be attached to the drill string at a surface location proximate to the surface rig system, the sensor calibration tool comprising a first tool sensor configured to measure the first operational parameter. The drilling sensor calibration system also includes a data gathering and analysis module includes a computer system comprising one or more processors and a non-transitory computer readable medium storing instructions executable by the one or more processors to perform operations. The operations include receiving, from the first tool sensor, the first tool sensor measurement of the first operational parameter, receiving, from the first rig sensor, the first rig sensor measurement of the first operational parameter, and displaying a comparison of the first tool sensor measurement with the first rig sensor measurement.

An aspect combinable with any of the other aspects can include the following features. The operations include calibrating the first rig sensor based on a comparison of the first tool sensor measurement with the first rig sensor measurement An aspect combinable with any of the other aspects can include the following features. The first tool sensor measurement includes a plurality of measurements over a period of time.

An aspect combinable with any of the other aspects can include the following features. The sensor calibration tool includes a memory module. The first rig sensor measurement is stored in the memory module.

An aspect combinable with any of the other aspects can include the following features. The sensor calibration tool includes a wireless transmitter. The first tool sensor measurement is transmitted via wireless telemetry from the sensor calibration tool to the data gathering and analysis module.

An aspect combinable with any of the other aspects can include the following features. The operations include calculating, by the data gathering and analysis module, a difference between the first tool sensor measurement and the first rig sensor measurement, comparing, by the data gathering and analysis module, the difference to a stored difference threshold, and transmitting, by the data gathering and analysis module, an alert in response to the difference exceeding the stored difference threshold.

An aspect combinable with any of the other aspects can include the following features. The operations include storing, by the data gathering and analysis module, historical measurements from the first rig sensor of the first operational parameter, and adjusting, by the data gathering and analysis module, the historical measurements based in part on the comparison of the first tool sensor measurement with the first rig sensor measurement.

An aspect combinable with any of the other aspects can include the following features. The first operational parameter includes a frequency of rotation of the drill string, a pressure of fluid pumped through a stand pipe line and down the drill string, a flow rate of fluid pumped through the stand pipe line and down the drill string, a temperature of fluid pumped through the stand pipe line and down the drill string, a torque load of the drill string, a frequency of mud pump strokes, a weight of the drill string, vibrations in the drill string, or acoustic signals in proximity of the drill string.

An aspect combinable with any of the other aspects can include the following features. The first surface component of the surface rig system includes a stand pipe line, a top drive, a mud pump, a mud pit, a rotary table, or a draw works for a drill line.

An aspect combinable with any of the other aspects can include the following features. The first rig sensor is included in a plurality of rig sensors, each rig sensor positioned on a respective one of a plurality of surface components of the surface rig system. Each rig sensor is configured to measure a respective one of a plurality of operational parameters, and wherein the first tool sensor is included in a tool sensor bank disposed on the sensor calibration tool, the tool sensor bank comprising a plurality of tool sensors, each tool sensor of the tool sensor bank configured to measure a respective one of the plurality of operational parameters. The operations include receiving, from each tool sensor in the tool sensor bank, a respective sensor measurement of the respective operational parameter for which the tool sensor is configured to measure, receiving, from each of a plurality of rig sensors, a respective sensor measurement of the respective operational parameter for which the rig sensor is configured to measure, and displaying a comparison of the respective tool sensor measurement with the respective tool sensor measurement of the respective operational parameter for which the rig sensor is configured to measure.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

During drilling operations, it can be useful for an operator to have information regarding various operational parameters of the well drilling system such as drill string weight, revolutions-per-minute (RPM) of the drill string, drilling fluid pressure, drilling fluid flow, drilling fluid temperature, drill string vibrations, noise, and/or tension, compression, drag, and/or strain of the drill string. Such information can be used by the operator to monitor drilling operations so as to optimize rate of penetration and otherwise maximize the safe, efficient, and cost-effective operation of the well system.

Sensors that measure such operational parameters are typically positioned on various surface components of the rig system. The kind, location, and accuracy of rig sensors can vary greatly with different well systems in different locations and different kinds and types of equipment and sensors. In addition, it is common for rig sensors to go out of calibration or otherwise develop inaccuracies that are reflected in the operational parameter information received by the operator. Different skill levels of crew members can also contribute to differences in operational parameter information received by the operator from the rig sensors.

This disclosure describes a system, tool, and method for monitoring the accuracy of the various rig sensors positioned on the various surface components of a well drilling system. In accordance with an embodiment of the disclosure, an instrumented sub comprising a sensor calibration tool housing one or multiple tool sensors can be attached to the drill string. Each of the tool sensors on the sensor calibration tool can measure an operational parameter that is also measured by a corresponding rig sensor that is positioned on a surface component. Sensor data from the rig sensors and the tool sensors can be captured by a data gathering and analysis module and displayed for the operator on a display screen. The system can be configured to alert the operator if differences between the rig sensor measurement and the tool sensor measurement exceed a threshold value. Based on the sensor data and comparison information provided by the system, rig sensors can be calibrated and/or otherwise adjusted and managed to enhance sensor data accuracy.

Properly calibrated and accurate rig sensors can contribute to a higher rate-of-penetration and avoid drill string failure and/or other conditions or events that can result in lost time and increased costs. The sensor calibration tool can be easily attached or detached from the drill string and carried to a different wellsite, such that the system with the same tool sensor suite can be utilized at multiple drilling locations, thus minimizing time and costs and allowing for consistent sensor calibration procedures and results.

In accordance with an embodiment of the present disclosure, the sensor calibration tool and system can be brought to a wellsite in response to an incident such as stuck pipe or twist off and installed on the well system to determine whether and the extent to which any rig sensors are out-of-calibration or otherwise inaccurate. Historical data related to the incident can be analyzed and corrected if necessary utilizing data from the sensor calibration tool. Data from the sensor calibration tool can be utilized in preventative tools such as machine learning algorithms for automated operations or rig crew training.

Figure 1:
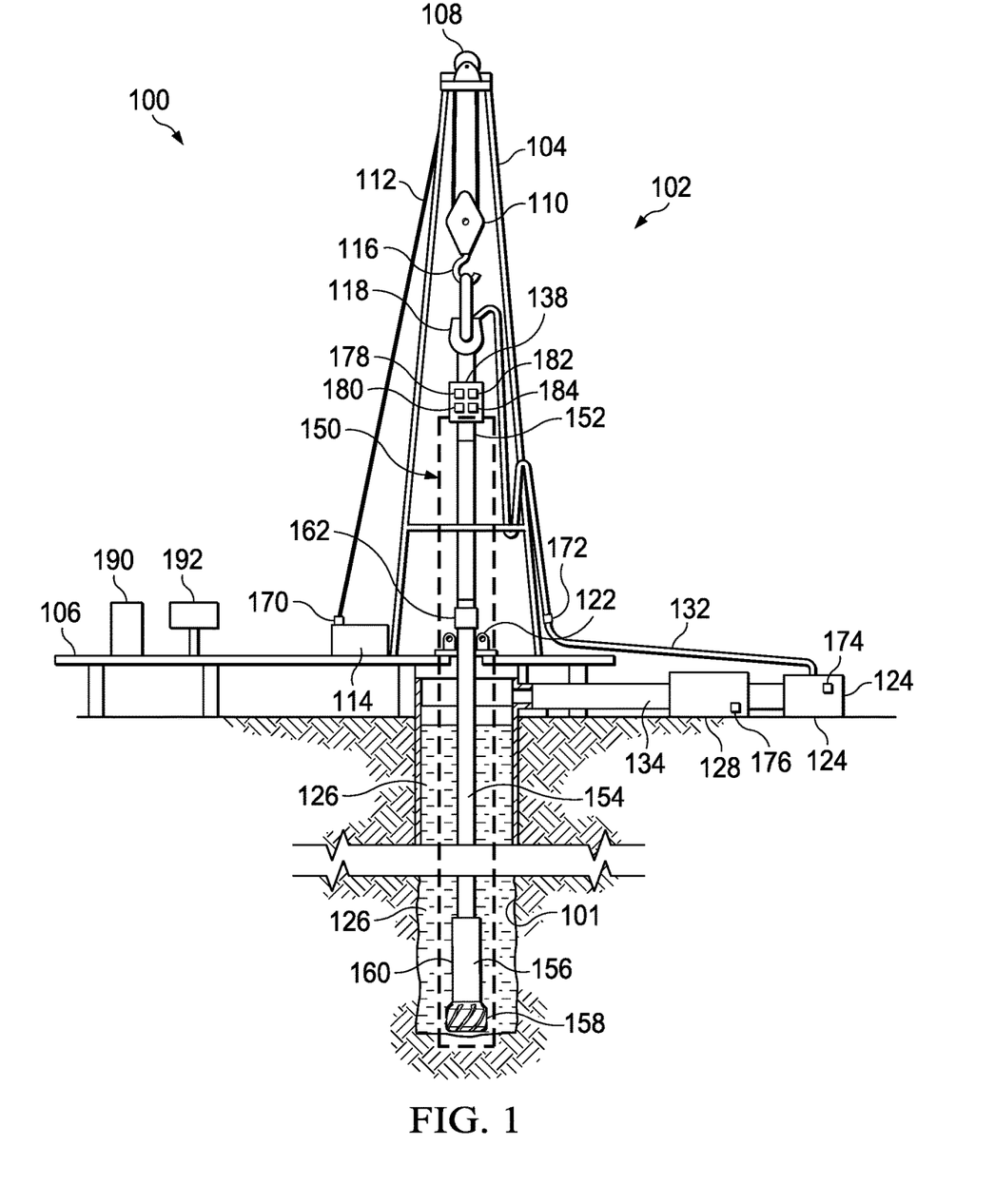
FIG. 1 is a drawing of an example well system in accordance with an embodiment of the present disclosure.

FIG. 1 illustrates a well system 100 in accordance with one embodiment of the present disclosure. In the illustrated embodiment, Well system 100 includes a conventional rotary land rig. However, the present disclosure is applicable to other types of onshore or offshore drilling rigs (including top drive, power swivel, down hole motor, and coiled tubing units) and to other drilling and/or production rigs or platforms that are operable to bore through the earth and/or produce hydrocarbons or other resources from the earth.

Well system 100 includes a surface rig system 102 and a drill string 150. Surface rig system 102 includes several surface components at or near the surface, including a derrick 104 that is supported above a rig floor 106. In other embodiments, a mast may be used in lieu of a derrick 104. Surface rig system 102 further includes a lifting gear that includes a crown block 108 mounted to the derrick 104, a travelling block 110, a hook 116, and a swivel 118. The crown block 108 and the travelling block 110 are interconnected by a cable 112 that is driven by draw works 114 to control the upward and downward movement of the travelling block 110. Travelling block 110 carries hook 116 from which is suspended swivel 118. The swivel 118 supports a top drive 138, which is also a surface component of surface rig system 102. Other surface components of surface rig system 102 include slips 122, mud pumps 124, stand pipe line 132, and mud tanks 128, described in more detail below. In other embodiments, surface rig system 102 can include other, more, and/or fewer surface components.

Drill string 150 includes drill pipe 154 (which comprises a plurality of interconnected drill pipe sections), and further includes a saver sub 152 at the top (uphole) end of drill string 150 and a bottom-hole assembly (BHA) 156 at the downhole end of drill string 150. BHA 156 includes a drill bit 158 and a mud motor 160, and may also include stabilizers, drill collars, measurement well drilling (MWD) instruments, and the like.

Drill string 150 is positioned at least partially in well bore 101. The top of drill string 150, specifically, saver sub 152, is attached to top drive 138. In this way, surface rig system 102 supports drill string 150. The weight of drill string 150 may be further supported by slips 122.

Surface rig system 102 also pumps drilling fluid, or mud, 126, down drill string 150. More specifically, mud pumps 124 draw drilling fluid 126 from mud tanks 128 through stand pipe line 132. The drilling fluid 126 is delivered to the drill string 150 through stand pipe line 132 which connects to swivel 118. From the swivel 118, the drilling fluid 126 travels through the drill string 150 to the BHA 156, where it turns the mud motor 160 and exits the bit 158 to scour the formation and lift the resultant cuttings through the annulus to the surface. At the surface, mud tanks 128 receive the drilling fluid 126 from the well bore 101 through a flow line 134. The mud tanks 128 and/or flow line 134 can include a shaker or other device to remove the cuttings.

Drilling is accomplished by rotating the drill string 150, which in turn rotates the bit 158, and applying weight on bit 158. Surface rig system 102, and specifically, top drive 138, provides the rotation to drill string 150 within bore hole 101. Alternatively or in addition, a down hole motor may rotate the bit 158 independently of the drill string 150 and the top drive 138. As previously described, the cuttings produced as bit 158 drills into the earth are carried out of bore hole 101 by the drilling fluid 126 supplied by pumps 124.

In some embodiments, a drilling rig may include a rotary table at the rig floor instead of a top drive. In such embodiments, the rotary table is part of the surface rig system and provides the rotation to drill string 150 during drilling operations.

Information regarding operational parameters of well system 100 such as drill string weight, revolutions-per-minute (RPM) of the drill string, drilling fluid pressure, drilling fluid flow, drilling fluid temperature, drill string vibrations, noise, and/or tension, compression, drag, and/or strain of the drill string can come from rig sensors positioned on (that is, attached to or positioned on the surface of or within) some of the surface components of surface rig system 102, such as draw works 114, stand pipe line 132, mud pumps 124, and/or top drive 138.

For example, in some embodiments, a hook load rig sensor 170 can attached to draw works 114 to measure the weight supported by draw works 114. Hook load rig sensor 170 can be attached at or near the "dead end" of cable 112 or another suitable location.

In some embodiments, additional rig sensors that measure other operational parameters are positioned on other surface components of surface rig system 102. For example, fluid pressure rig sensor 172 can be disposed on or within stand pipe line 132 to measure a pressure of drilling fluid 126 fluid pumped through a stand pipe line 132 and down drill string 150. A flow rig sensor 174 can be disposed one or within mud pumps 124 to measure the rate of flow of drilling fluid 126 pumped by mud pumps 124 through stand pipe line 132 and down drill string 150. In some embodiments, flow rig sensor 174 can detect the number of strokes per minute of mud pumps 124 instead of or in addition to the flow rate. A temperature rig sensor 176 can be disposed on or within mud pumps 124 to measure a temperature of drilling fluid 126.

In some embodiments, one or more sensors can be attached to top drive 138. For example, a torque rig sensor 178 can be attached to top drive 138 to measure a torque load of the drill string. A revolutions-per-minute (RPM) rig sensor 180 can be attached to top drive 138 to measure a frequency of rotation of the drill string. A vibration rig sensor 182 can be attached to top drive 138 to measure vibration at or near the top of drill string 150. An acoustic rig sensor 184 can be attached to top drive 138 to measure noise or other acoustic signals at or near the top of drill string 150.

In drilling systems where a rotary table is used instead of a top drive, the torque, RPM, vibration, and acoustic rig sensors can be attached to or near the rotary table instead of top drive 138. Vibration and/or acoustic rig sensors can also be attached to other surface components of surface rig system 102.

In some embodiments, all of the above-described rig sensors are attached to the surface components of surface rig system 102 as described above. In other embodiments, only one or some of the above-described rig sensors are attached to the surface rig system 102 components. In some embodiments, additional or other rig sensors can be included to measure the above-described or other operational parameters, and/or rig sensors can be placed within, on, or near different or additional surface components of surface rig system 102 than the ones described above.

In an embodiment of the present disclosure, a sensor calibration tool 162 can be attached to drill string 150. As described in more detail in reference to FIGS. 2 and 3, sensor calibration tool 162 can house a tool sensor bank which can include one or more tool sensors which can measure operational parameters such as drill string weight, torque, revolutions-per-minute (RPM) of the drill string, drilling fluid pressure, drilling fluid flow, drilling fluid temperature, drill string vibrations, noise, tension, compression, drag, and/or pipe bending. Sensor calibration tool 162 can be attached to drill string 150 before insertion of drill string 150 into wellbore 101 or after at least a portion of drill string 150 is disposed at least partially within wellbore 101. As described in further detail below, data from the tool sensors on sensor calibration tool 162 can be compared to data from the rig sensors on the surface components of surface rig system 102, the accuracy of the rig sensors can be analyzed and sensors calibrated or otherwise adjusted as necessary so as to optimize drilling operations.

Figure 2:
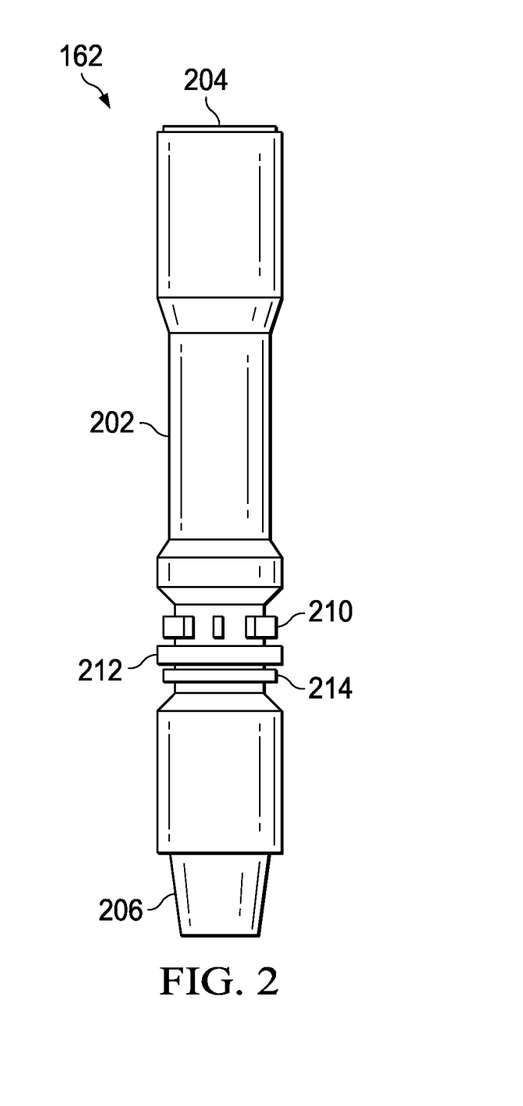
FIG. 2 is a drawing of a sensor calibration tool in accordance with an embodiment of the present disclosure.
Figure 3:
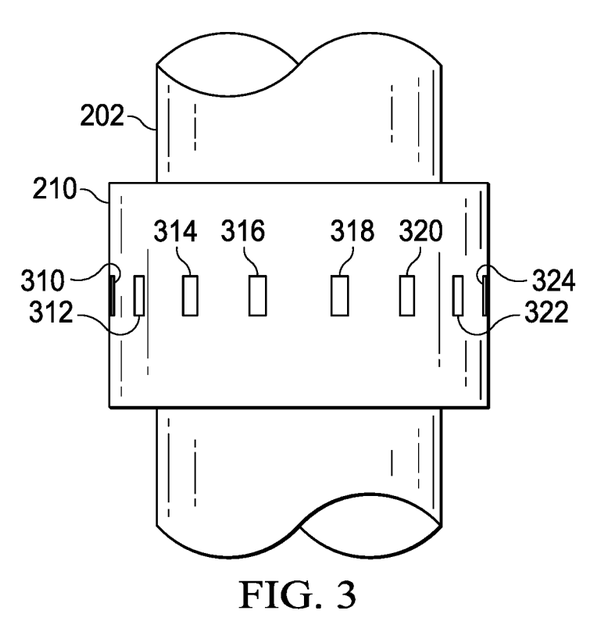
FIG. 3 is a drawing of a sensor bank on a sensor calibration tool in accordance with an embodiment of the present disclosure.
Figure 4A:
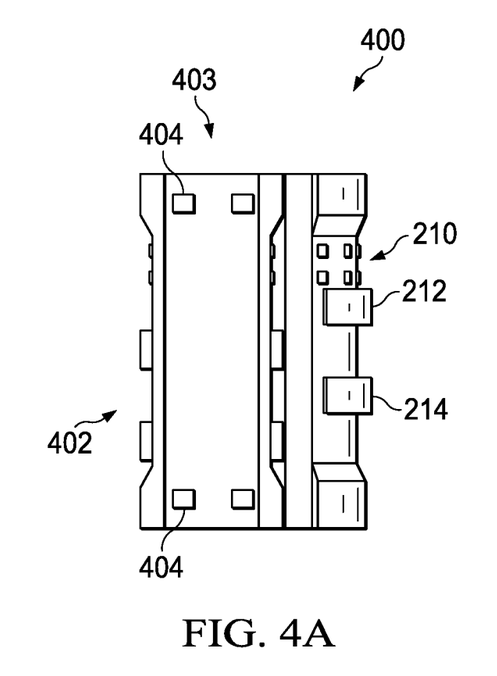
FIGS. 4A and 4B are drawings of a sensor calibration tool in accordance with an alternative embodiment of the present disclosure.
Figure 4B:
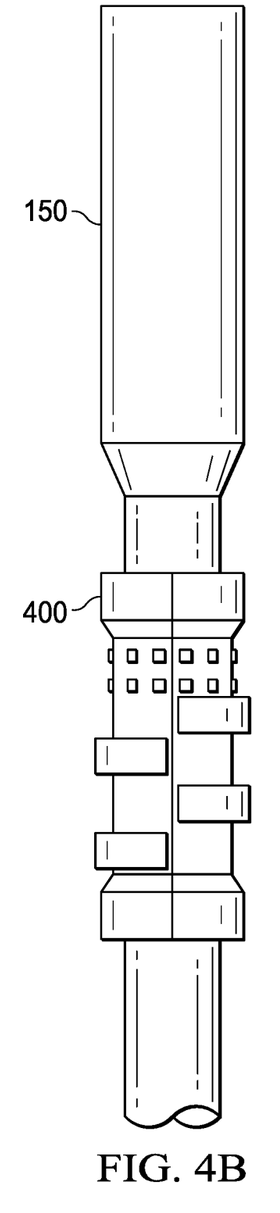

As described in more detail in FIGS. 2-4, sensor calibration tool 162 can include, in addition to a sensor bank including one or multiple tool sensors, a communication module to transmit the tool sensor data. The communication module which can include a wireless transmitter (such as wi-fi, Bluetooth, laser, or acoustic) or other suitable data transmission means. In some embodiments, sensor calibration tool 162 can also include a memory module to store historical or current sensor data from the tool sensors. Sensor calibration tool 162 can also include a power module to provide power to the tool sensors and/or the communication module and/or memory module.

Well system 100 also includes a data gathering and analysis module 190 to receive and/or analyze sensor data from the rig sensor or sensors and the tool sensor or sensors, as described in further detail below. Data gathering and analysis module 190 can include a wireless reader or other receiver to download information from sensor calibration tool 162 such as sensor data from tool sensors of sensor calibration tool 162. Data gathering and analysis module 190 can also be configured to receive data from one, some, or all of the rig sensors of surface rig system 102, via wired or wireless connection.

In some embodiments, data gathering and analysis module 190 includes a computer system that comprises one or more processors, and a computer-readable medium (for example, a non-transitory computer-readable medium) storing computer instructions executable by the one or more processors to perform operations. In some embodiments, data gathering and analysis module 190 is configured to receive display sensor data received from the rig sensors and/or the tool sensors and transmit the information to data display screen 192, which can provide the information to an operation using a graphical user interface (GUI) or other suitable user interface. Sensor data from a rig sensor of a surface component of surface rig system 102 can be displayed next to sensor data from a tool sensor on sensor calibration tool 162 for the same operational parameter. An operator observing a difference in the sensor data between the rig sensor and the corresponding tool sensor can take a suitable action such as calibrating or otherwise adjusting the rig sensor and/or replacing a failed rig sensor.

For example, sensor calibration tool 162 can include a weight sensor which provides information regarding the weight of drill string 150. Measurements from the weight tool sensor can be displayed next to data from hook load rig sensor 170 on draw works 114. Sensor calibration tool 162 can also include a tool sensor that is an RPM sensor to measure the RPM of drill string 150, and measurements from this RPM tool sensor can be displayed next to data from RPM rig sensor 180 on top drive 138. Values from other tool sensors on sensor calibration tool 162 can likewise be displayed next to corresponding values for the same operational parameter from rig sensors on surface rig system 102.

In some embodiments, while attached to drill string 150, sensor calibration tool 162 is positioned at a surface location proximate to surface rig system 102 and the tool sensor measurements and rig sensor measurements can be transmitted and received while the tool is positioned at this surface location. In some embodiments, sensor calibration tool 162 is positioned above rig floor 106. In some embodiments, sensor calibration tool 162 can be positioned at a near-surface location some distance downhole, for example, within about 300 feet of the surface. For example, in the embodiment illustrated in FIG. 1, sensor calibration tool 162 is positioned on the drill string just above rig floor 106 and is proximate to surface components of surface rig system 102 such as top drive 138, draw works 114, and mud pumps 124. Such a surface position allows for data from sensor calibration tool to be most easily, quickly, and accurately transmitted to data gathering and analysis module 190 and/or otherwise accessed via wireless transmission or other means. Also, so positioned at a surface location, data from the tool sensors on sensor calibration tool 162 can in some embodiments be more accurately and directly compared to the data from the nearby rig sensors of surface rig system 102, for a given operational parameter. In some embodiments, locating sensor calibration tool 162 at a surface location can result in more accurate torque measurements, as no frictional losses from rubbing of the tool against the wellbore would be required to be taken into account. In some embodiments, sensor calibration tool 162 can be positioned at a surface location and drill pipes 154 added to drill string 150 below sensor calibration tool 162, and so positioned can provide measurements of the weight of individual drill pipes 154 as they are added to the drill string.

As drilling continues and drill string 150 travels further downhole, sensor calibration tool 162 can be removed from drill string 150 before sensor calibration tool 162 descends into (or further into) wellbore 101. In some embodiments, sensor calibration tool 162 can then be reattached at a higher point on drill string 150 to maintain the position of sensor calibration tool 162 at a surface location as drilling operations continue. In some embodiments, sensor calibration tool 162 is attached to saver sub 152 and drill pipes 154 added beneath sensor calibration tool 162, such that sensor calibration tool 162 remains at a surface location as drill pipes 154 and other portions of drill string 150 are lowered into wellbore 101. In some embodiments, sensor calibration tool 162 is lowered into wellbore 101 along with other components of drill string 150 as drill string 150 travels further downhole.

As described in further detail with regards to FIGS. 2 and 4, sensor calibration tool 162 can be configured as a threaded sub or a clamp that can be readily and easily attached and/or detached from drill string 150. In this way, sensor calibration tool 162 can continue to be positioned at a surface location. Also, because it is easily attachable and detachable, sensor calibration tool 162 can be easily deployed at different well sites, thus minimizing time and costs and allowing for consistent sensor results and consistent calibration procedures and results for different well systems. Likewise, in some embodiments, data gathering and analysis module 190 and display screen 192 can be portable units. In some embodiments, some of the gathering and analysis functions of data gathering and analysis module 190 can be performed in a cloud or edge network.

In some embodiments, data gathering and analysis module 190 can adjust the measurements from the rig sensors and/or the tool sensors so as to make the measurements more directly comparable. For example, in some embodiments, a measurement from hook load rig sensor 170 on draw works 114 can be adjusted by removing (manually or automatically) the known weight of travelling block 110, hook 116, swivel 118, and top drive 138 such that what is left represents the weight of drill string 150 and can be more directly compared to the measurement of the weight of drill string 150 from the weight sensor on sensor calibration tool 162. In some embodiments, no adjustment is necessary because any adjustment would be within the margin of error of the sensor.

In some embodiments, sensor data can be streamed and displayed in real time, and can include single measurements and/or multiple measurements over time. In some embodiments, historical sensor data can be downloaded from sensor calibration tool 162 to data gathering and analysis module 190 and retrieved by the operator from data gathering and analysis module 190 as needed by inputting retrieval commands.

In some embodiments, data gathering and analysis module 190 can be configured to analyze the sensor data and provide alerts the operator when a calibration is required and/or perform other actions. For example, data gathering and analysis module 190 can be configured to calculate the difference between a measurement from a tool sensor on sensor calibration tool 162 of an operational parameter and the corresponding rig sensor measurement (from a rig sensor on a surface component of surface rig system 102) of that operational parameter. Some difference may be an acceptable operational variation, but a greater difference may be an unacceptable variation indicating an out-of-calibration sensor or other condition requiring action by the operator. In some embodiments, data gathering and analysis module 190 can store a threshold value of the difference, above which above which calibration or another action is required. A difference below the threshold value would not trigger an alert; a difference above the threshold value would trigger an alert.

In some embodiments, once the alert is received, the operator can calibrate the rig sensor as necessary in light of the data from the sensor calibration tool 162. Such calibration can be done manually or automatically.

In some embodiments, data gathering and analysis module 190 can be configured to measure and record the standard deviation between tool sensor data and rig sensor data. In some embodiments, data gathering and analysis module 190 can be configured to store historical data including values from the rig sensors and the tool sensors and/or standard deviation data. In some embodiments, data gathering and analysis module 190 can be configured to compare historical data from rig sensors with historical data from tool sensors of their respective operational parameters. In some embodiments, data gathering and analysis module 190 can adjust or correct historical rig sensor data based on this comparison with historical or current tool sensor data and provide the operator with an output comprising such adjusted or corrected historical sensor rig data.

In some embodiments, sensor data from sensor calibration tool 162 can be used to train machine learning algorithms and/or otherwise used to understand and optimize drill string behavior and/or drilling optimization.

In some embodiments, the sensor calibration tool and system can be brought to a wellsite in response to an incident such as stuck pipe or twist off and installed on the well system to determine whether and the extent to which any rig sensors are out-of-calibration or otherwise inaccurate. Where similar incidents have occurred at multiple wells, the system and method can be brought to each of those wells such that historical data related to the incidents at the different wells can be analyzed, corrected, and compared using a common tool and system. By correcting historical data and comparing corrections from different rig systems (which may have significant discrepancies in rig sensor accuracy) with the same calibration tool, a better understanding of the incident(s) can be achieved and future incidents avoided. Data from the system and method can be utilized in preventative tools such as machine learning algorithms for automated operations or rig crew training.

FIG. 2 is a drawing of sensor calibration tool 162 in accordance with an embodiment of the present disclosure. In the embodiment shown in FIG. 2, sensor calibration tool 162 is an instrumented sub including a mandrel 202, an upper connection 204, and a lower connection 206. Upper connection 204 and lower connection 206 can comprise threaded connections that can be attached to threaded drill pipe segments of drill string 150 using known methods. For example, in one embodiment, sensor calibration tool 162 can be attached to drill pipe segment or segments that are in a mouse hole at the rig, and the drill pipe and tool combination then attached to drill string 150. In another embodiment, sensor calibration tool 162 can be threaded directly to a drill pipe that is already attached to drill string 150.

Sensor calibration tool 162 as shown in FIG. 2 also includes a sensor bank 210 that includes multiple individual tool sensors to measure operational parameters, as described above. Sensor bank 210 is described in further detail in FIG. 3. Sensor calibration tool 162 also includes power source 212 which can include one or more batteries. In some embodiments, power can be provided from another source (for example, a power cable and/or a fluid turbine) in lieu of or in addition to batteries. Communication module 214 can include a wireless transmitter (such as wi-fi, Bluetooth, laser, or acoustic) or other suitable means for transmitting sensor data. Sensor calibration tool 162 can further include a memory module (not shown). In some embodiments, the memory module can comprise a SDD or HDD or similar memory system and a USB interface.

FIG. 3 is a drawing of a sensor bank on a sensor calibration tool 162 in accordance with an embodiment of the present disclosure. The features of sensor bank the sensor bank illustrated in FIG. 3 are described in reference to the elements described in reference to FIGS. 1 and 2.

In the illustrated embodiment, the sensor bank illustrated in FIG. 3 is sensor bank 210 of FIG. 2 and is disposed on mandrel 202. In the illustrated embodiment, sensor bank 210 includes eight tool sensors: weight tool sensor 310, fluid pressure tool sensor 312, flow tool sensor 314, temperature tool sensor 316, torque tool sensor 318, RPM tool sensor 320, vibration tool sensor 322, acoustic tool sensor 324. Each tool sensor can measure a respective operational parameter. In some embodiments, sensor bank 210 may include a different number (for example, fewer) tool sensors and/or sensors for different and/or additional operational parameters than as described above. Sensor data from the tool sensors can be compared to rig sensor data for the corresponding operational parameter, as described above in reference to FIG. 1.

Specifically, for example, weight tool sensor 310 can measure the weight of drill string 150, and data from weight tool sensor 310 can be compared to data from hook load rig sensor 170. Fluid pressure tool sensor 312 can measure the pressure of drilling fluid flowing through drill string 150, and data from fluid pressure tool sensor 312 can be compared to data from fluid pressure rig sensor 172. Flow tool sensor 314 can measure the flow rate of drilling fluid flowing through drill string 150 and data from flow tool sensor 314 can be compared to data from flow rig sensor 174. Temperature tool sensor 316 can measure the temperature of drilling fluid flowing through drill string 150, and data from temperature tool sensor 316 can be compared to data from temperature rig sensor 176. Torque tool sensor 318 can measure a torque load of drill string 150, and data from torque tool sensor 318 can be compared to data from torque rig sensor 178. RPM tool sensor 320 can measure the frequency of rotation of drill string 150, and data from RPM tool sensor 320 can be compared to data from RPM rig sensor 180. Vibration tool sensor 322 can measure vibrations of drill string 150, and data from vibration tool sensor 322 can be compared to data from vibration rig sensor 182. Acoustic tool sensor 324 can measure noise or other acoustic signals at or near the top of drill string 150, and data from acoustic tool sensor 324 can be compared to data from acoustic rig sensor 184.

FIGS. 4A and 4B are drawings of a sensor calibration tool in accordance with an alternative embodiment of the present disclosure. In the embodiment shown in FIG. 4, the sensor calibration tool is configured as a clamp that can be attached to the exterior of drill string 150.

Referring to FIG. 4A, sensor calibration clamp tool 400 includes a body 402 that splits in half. In FIG. 4A, sensor calibration clamp tool 400 is in an open position revealing interior surface 403. Interior surface 403 includes latching mechanisms 404 which are configured to attach to an exterior surface of a drill string (such as drill string 150 of FIG. 1), as shown in FIG. 4B.

Like sensor calibration tool 162 of FIG. 2, sensor calibration clamp tool 400 includes a sensor bank 210, a power source 212, and a communication module 214. Sensor bank 210, power source 212, and communication module 214 have a structure and function as described in reference to FIG. 3.

Sensor calibration clamp tool 400 can, in some embodiments, be more easily attachable and detachable from the drill string than sensor calibration tool 162, resulting in further cost and time savings. In some embodiments, sensor bank 210 of sensor calibration clamp tool 400 may have the same suite of tool sensors as sensor calibration tool 162. In some embodiments, sensor bank 210 of calibration clamp tool 400 may have a different suite and/or a different number of tool sensors than the sensor bank of sensor calibration tool 162. For example, in some embodiments, sensor calibration clamp tool 400 can include tool sensors for torque, RPM, and vibration, but not include sensors for flow, pressure, and/or temperature.

Figure 5:
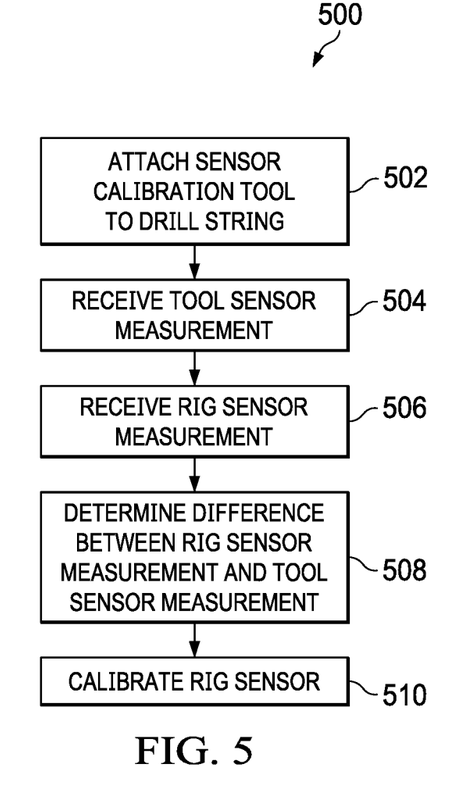
FIG. 5 is a process flow diagram of a method for determining an accuracy of a rig sensor in accordance with an embodiment of the present disclosure.

FIG. 5 is a process flow diagram of a method for determining an accuracy of a rig sensor in accordance with an embodiment of the present disclosure. The method is described with reference to the components described in reference to FIGS. 1-2.

Referring to FIG. 5, method 500 begins at block 502 with attaching a sensor calibration tool (such as sensor calibration tool 162) to a drill string (such as drill string 150). As described in reference to FIGS. 1 and 2, the sensor calibration tool includes on or many tool sensors, each of which is configured to measure a respective operational parameter.

As described in reference to FIG. 1, the drill string can be disposed at least partially within a wellbore and supported by a surface rig system and the sensor calibration tool can be positioned on the drill string at a surface location proximate to the surface rig system. Proceeding to block 504, a receiver such as a data gathering and analysis module 190 receives a tool sensor measurement of the respective operational parameter from one of the tool sensors.

Proceeding to block 506, the data gathering and analysis module or other suitable receiver receives a rig sensor measurement from a rig sensor positioned on a surface component of the surface rig system, of the same operational parameter that was also measured by the tool sensor operational parameter Proceeding to block 508, a difference between the rig sensor measurement and the tool sensor measurement is determined. This can be done manually by an operator or automatically by the data gathering and analysis module.

In some embodiments, the difference can be compared to a difference threshold. If the difference threshold is exceeded, the data gathering and analysis module can transmit an alert to the operator.

Proceeding to block 510, the rig sensor is calibrated based on the comparison of the tool sensor measurement with the rig sensor measurement. Calibration can be done manually or automatically as described in reference to FIG. 1.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" or "substantially" means a deviation or allowance of up to 10 percent (%) and any variation from a mentioned value is within the tolerance limits of any machinery used to manufacture the part. Likewise, "about" can also allow for a degree of variability in a value or range, for example, within 10%, within 5%, or within 1% of a stated value or of a stated limit of a range.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

While this disclosure contains many specific implementation details, these should not be construed as limitations on the subject matter or on what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. A method comprising:
    attaching, to a drill string disposed at least partially within a wellbore and supported by a surface rig system, a sensor calibration clamp tool, the sensor calibration clamp tool positioned on the drill string at a surface location proximate to the surface rig system, wherein the sensor calibration tool comprises a sensor bank comprising a plurality of tool sensors, each of the plurality of tool sensors configured to measure a respective operational parameter of a plurality of operational parameters;
    conducting sensor calibration while the sensor calibration clamp tool is attached to the drill string at the surface location, wherein the sensor calibration comprises:
        receiving, from a first tool sensor of the plurality of tool sensors, a first tool sensor measurement of a first operational parameter of the plurality of operational parameters;
        receiving, from a first rig sensor positioned on a first surface component of the surface rig system, a first rig sensor measurement of the first operational parameter; and
        calibrating the first rig sensor based on a comparison of the first tool sensor measurement with the first rig sensor measurement; and
    while the drill string is lowered downhole, continuing to position the sensor calibration clamp tool on the drill string at the surface location by detaching and re-attaching the sensor calibration clamp tool to the drill string.

2. The method of claim 1, wherein the first tool sensor measurement and the first rig sensor measurement each comprise a respective plurality of measurements of the first operational parameter over a period of time.

3. The method of claim 1, wherein the sensor calibration tool further comprises a memory module, and further comprising storing the first rig sensor measurement in the memory module.

4. The method of claim 1, wherein the receiving of the first tool sensor measurement and the receiving of the first rig sensor measurement are by a data gathering and analysis module comprising a computer system comprising:
    one or more processors; and
    a non-transitory computer readable medium storing instructions executable by the one or more processors to perform operations.

5. The method of claim 4, wherein the sensor calibration tool further comprises a wireless transmitter, and further comprising transmitting from the sensor calibration tool via wireless telemetry the first tool sensor measurement to the data gathering and analysis module.

6. The method of claim 4, further comprising:
    calculating, by the data gathering and analysis module, a difference between the first tool sensor measurement and the first rig sensor measurement;
    comparing, by the data gathering and analysis module, the difference to a stored difference threshold; and
    transmitting, by the data gathering and analysis module, an alert in response to the difference exceeding the stored difference threshold.

7. The method of claim 4, further comprising:
    storing, by the data gathering and analysis module, historical measurements from the first rig sensor of the first operational parameter; and
    adjusting, by the data gathering and analysis module, the historical measurements based in part on the comparison of the first tool sensor measurement with the first rig sensor measurement.

8. The method of claim 1, wherein the first operational parameter comprises at least one of:
    a frequency of rotation of the drill string;
    a pressure of fluid pumped through a stand pipe line and down the drill string;
    a flow rate of fluid pumped through the stand pipe line and down the drill string;
    a temperature of fluid pumped through the stand pipe line and down the drill string;
    a torque load of the drill string;
    a frequency of mud pump strokes;
    a weight of the drill string;
    vibrations in the drill string; or
    acoustic signals in proximity of the drill string.

9. The method of claim 1, wherein the first surface component of the surface rig system comprises at least one of:
- a stand pipe line;
- a top drive;
- a mud pump;
- a mud pit;
- a rotary table; or
- a draw works for a drill line.

10. The method of claim 1, wherein the first rig sensor is included in a plurality of rig sensors, each rig sensor positioned on a respective one of a plurality of surface components of the surface rig system, each rig sensor configured to measure a respective one of the plurality of operational parameters, and wherein the method further comprises:
- receiving, from each tool sensor in the tool sensor bank, a respective tool sensor measurement of the respective operational parameter for which the tool sensor is configured to measure;
- receiving, from each of a plurality of rig sensors, a respective rig sensor measurement of the respective operational parameter for which the surface rig sensor is configured to measure;
- calibrating each of the plurality of rig sensors based on a comparison of the respective tool sensor measurement with the respective rig sensor measurement of the respective operational parameter for which the rig sensor is configured to measure.

11. A drilling sensor calibration system, comprising:
- a surface rig system configured to support a drill string disposed at least partially within a wellbore;
- a first rig sensor positioned on a first surface component of the surface rig system, the first rig sensor configured to measure a first operational parameter of a plurality of operational parameters;
- a sensor calibration clamp tool comprising a sensor bank comprising a plurality of tool sensors, each of the plurality of tool sensors configured to measure a respective operational parameter of the plurality of operational parameters, wherein the sensor calibration clamp tool is configured to be attached, removed, and re-attached to the drill string to continue to position the sensor calibration clamp tool on the drill string at a surface location proximate to the surface rig system as the drill string is lowered downhole within the wellbore; and
- a data gathering and analysis module, the data gathering and analysis module comprising a computer system comprising:
  - one or more processors; and
  - a non-transitory computer readable medium storing instructions executable by the one or more processors to perform operations comprising, while the sensor calibration clamp tool is attached to the drill string at the surface location:
    - receiving, from a first tool sensor of the plurality of tool sensors, a first tool sensor measurement of a first operational parameter of the plurality of operational parameters;
    - receiving, from the first rig sensor, the first rig sensor measurement of the first operational parameter; and
    - displaying a comparison of the first tool sensor measurement with the first rig sensor measurement.

12. The system of claim 11, wherein the operations further comprise calibrating, while the sensor calibration clamp tool is attached to the drill string at the surface location, the first rig sensor based on a comparison of the first tool sensor measurement with the first rig sensor measurement.

13. The system of claim 11, wherein the first tool sensor measurement comprises a plurality of measurements over a period of time.

14. The system of claim 11, wherein the sensor calibration tool further comprises a memory module, and further comprising storing the first rig sensor measurement in the memory module.

15. The system of claim 11, wherein the sensor calibration tool further comprises a wireless transmitter, and further comprising transmitting from the sensor calibration tool via wireless telemetry the first tool sensor measurement to the data gathering and analysis module.

16. The system of claim 11, wherein the operations further comprise:
- calculating, by the data gathering and analysis module, a difference between the first tool sensor measurement and the first rig sensor measurement;
- comparing, by the data gathering and analysis module, the difference to a stored difference threshold; and
- transmitting, by the data gathering and analysis module, an alert in response to the difference exceeding the stored difference threshold.

17. The system of claim 11, wherein the operations further comprise:
- storing, by the data gathering and analysis module, historical measurements from the first rig sensor of the first operational parameter; and
- adjusting, by the data gathering and analysis module, the historical measurements based in part on the comparison of the first tool sensor measurement with the first rig sensor measurement.

18. The system of claim 11, wherein the first operational parameter comprises at least one of:
- a frequency of rotation of the drill string;
- a pressure of fluid pumped through a stand pipe line and down the drill string;
- a flow rate of fluid pumped through the stand pipe line and down the drill string;
- a temperature of fluid pumped through the stand pipe line and down the drill string;
- a torque load of the drill string;
- a frequency of mud pump strokes;
- a weight of the drill string;
- vibrations in the drill string; or
- acoustic signals in proximity of the drill string.

19. The system of claim 11, wherein the first surface component of the surface rig system comprises at least one of:
- a stand pipe line;
- a top drive;
- a mud pump;
- a mud pit;
- a rotary table; or
- a draw works for a drill line.

20. The system of claim 11, wherein the first rig sensor is included in a plurality of rig sensors, each rig sensor positioned on a respective one of a plurality of surface components of the surface rig system, each rig sensor configured to measure a respective one of the plurality of operational parameters, and wherein the operations further comprise:

receiving, from each tool sensor in the tool sensor bank, a respective sensor measurement of the respective operational parameter for which the tool sensor is configured to measure;

receiving, from each of a plurality of rig sensors, a respective sensor measurement of the respective operational parameter for which the rig sensor is configured to measure; and displaying a comparison of the respective tool sensor measurement with the respective rig sensor measurement of the respective operational parameter for which the rig sensor is configured to measure.

\* \* \* \* \*